Inventor
John A. Rhodes

Patented May 26, 1925.

1,539,771

UNITED STATES PATENT OFFICE.

JOHN ANSIA RHODES, OF ATLANTA, GEORGIA, ASSIGNOR TO JAMES H. WALKER, JR., OF GRIFFIN, GEORGIA.

SPRAYING APPARATUS.

Application filed January 12, 1924. Serial No. 685,919.

*To all whom it may concern:*

Be it known that I, JOHN ANSIA RHODES, a citizen of the United States, residing at Atlanta, in the county of Fulton and State of Georgia, have invented certain new and useful Improvements in Spraying Apparatus, of which the following is a specification, reference being had to the accompanying drawings.

This invention relates to certain improvements in spraying apparatus and has relation more particularly to a device of this general character especially designed and adapted for use in spraying plants and the like to destroy insect life and the like to destroy insect life thereon and it is an object of the invention to provide a novel and improved device of this general character embodying a supply receptacle having associated therewith a pump to effect the requisite spraying.

It is also an object of the invention to provide a novel and improved device of this general character of a portable type wherein is employed a force feed in driven connection with a supporting wheel for the device.

The invention consists in the details of construction and in the combination and arrangement of the several parts of my improved spraying apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be better understood, I will now proceed to describe the same with reference to the accompanying drawings, wherein:—

Figure 1:
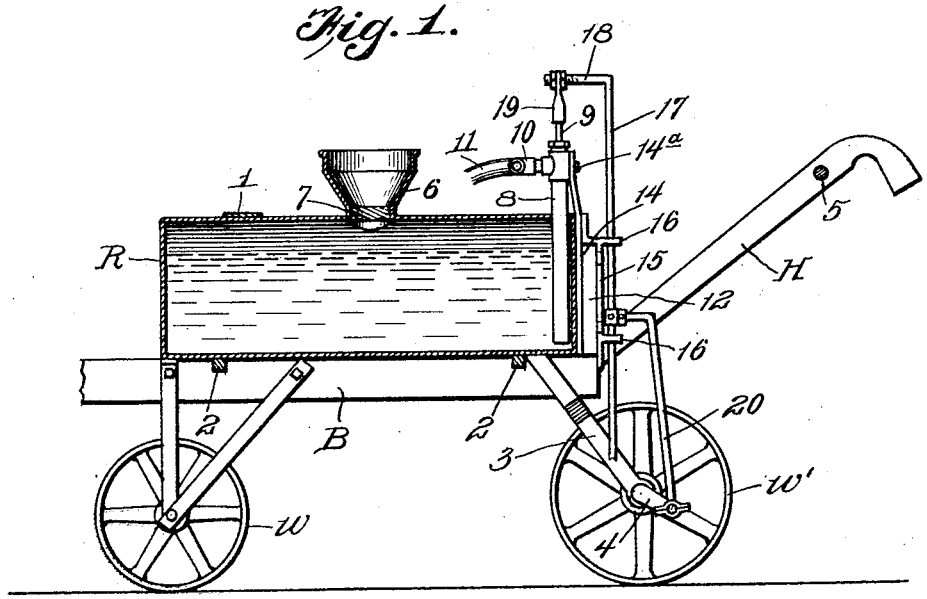
Figure 1 is a view partly in vertical section and partly in side elevation of a spraying apparatus constructed in accordance with an embodiment of my invention.
Figure 2:
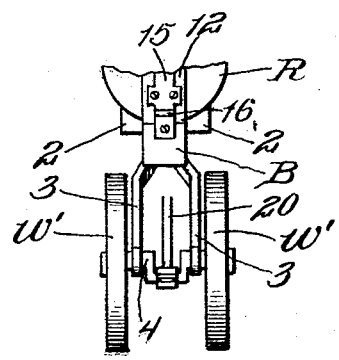
Figure 2 is a fragmentary view in rear elevation of an apparatus as herein set forth.

As disclosed in the accompanying drawings, B denotes a beam of requisite dimensions and which has mounted thereon an elongated cylindrical receptacle or tank R of desired capacity. This receptacle or tank R may be held to the beam B in any manner which best complies with the requirements of practice but as herein disclosed is maintained against displacement by the straps 1 and the supporting blocks 2. Associated with the beam B adjacent the forward end of the receptacle or tank R is a ground engaging wheel W and depending from the rear portion of the beam B is a fork 3 which provides a mounting for a crank shaft 4. The extremities of the shaft 4 extend outwardly beyond the arms of the fork 3 and to said extended or end portions are fixed the ground engaging wheels W' so that as the apparatus travels the wheels W' will operate to cause the requisite rotation of the shaft 4. The apparatus may be transported in any desired manner, either by animals or otherwise, as may be preferred. Extending upwardly from the rear portion of the beam B are the diverging handle members H connected in a conventional manner at their opposite portions by a cross member 5. The handle members H are adapted to be grasped by an operator following or trailing the apparatus whereby the device may be guided in accordance with the necessities of practice.

The upper portion of the receptacle or tank R at substantially the center is provided with a filling vent 6 which is normally closed by a plug 7 or the like.

Extending within the receptacle or tank R adjacent its rear end and through the top thereof is the casing or cylinder 8 of a pump of a reciprocating type, the piston or plunger (not shown) of said pump mechanism being operated through the instrumentality of the rod 9 extending above the upper or outer end of the casing 8. In communication with the upper portion of the casing 8 is a discharge manifold 10 having in communication therewith one or more discharge or delivery lines 11 which may be flexible or otherwise.

Extending upwardly from the rear portion of the beam B and in close proximity to the rear end of the receptacle or tank R is a post or column 12. Overlying and secured to the inner vertical face of the post or column 12 is an elongated bracket or arm 14 which is secured as at 14ª to the upper end portion of the pump casing or cylinder 8 to facilitate the maintenance of said casing or cylinder in working or applied position.

Secured to the rear face of the pillar or post 12 and extending lengthwise thereof is a plate 15 provided with the vertically spaced and rearwardly directed guide members or ears 16 through which is slidably directed the vertically disposed rod 17. The upper end portion of the rod 17 is continued by a forwardly directed and substantially horizontally disposed extension arm 18 which is operatively engaged through the medium of the coupling 19 with the rod 9 of the pump piston or plunger so that upon vertical reciprocation of the rod 17 the requisite rectilinear movement will be imparted to the rod 9.

20 denotes a pitman having one end portion operatively engaged with the crank shaft 4 and with its opposite end portion operatively engaged with the rod 17 and preferably at a point between the guide members or ears 16.

The solution within the tank R is of a character to destroy insect life and particularly boll weevil or kindred parasite although I do not wish to be understood as limiting myself as to any particular preparation or composition for use in connection with the apparatus herein disclosed because while primarily the purpose of the present apparatus is intended for use in connection with cotton or kindred plants it is to be understood that the apparatus can be employed with equal facility for spraying other objects.

From the foregoing description it is thought to be obvious that a spraying apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described comprising a beam, supporting wheels therefor, a tank mounted on the beam, an upstanding pillar carried by the beam adjacent to the tank, a force pump extending within the tank, means for supporting the pump on the pillar, said pump including a reciprocating member, a rod, guide means carried by the pillar for the rod, an operative connection between the rod and certain of the supporting wheels for reciprocating the rod during travel of the device, and means for operatively connecting the rod with the reciprocating plunger to reciprocate the plunger with the rod.

2. A device of the class described comprising a beam, supporting wheels therefor, a tank mounted on the beam, an upstanding pillar carried by the beam adjacent to the tank, a force pump extending within the tank, means for supporting the pump on the pillar, said pump including a reciprocating member, a rod, a plate secured to the pillar, outstanding ears carried by the plate through which the rod is slidably disposed, an operative connection between the rod and certain of the supporting wheels for reciprocating the rod during travel of the device, and means for operatively connecting the rod with the reciprocating plunger to reciprocate the plunger with the rod.

In testimony whereof I hereunto affix my signature.

JOHN ANSIA RHODES.